UNITED STATES PATENT OFFICE.

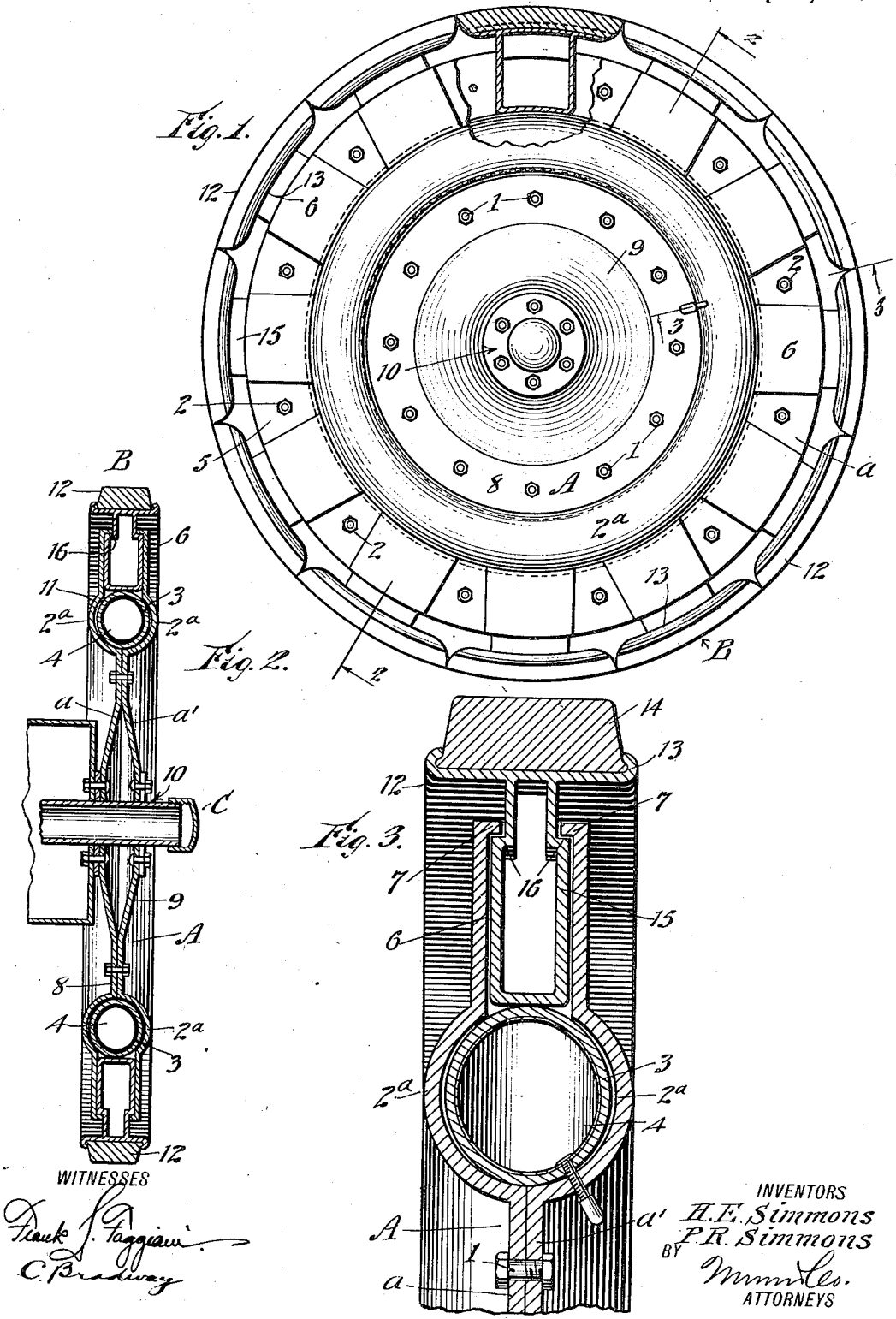

HOWARD E. SIMMONS AND PAUL R. SIMMONS, OF HUNTINGTON, INDIANA.

AUTOMOBILE OR TRUCK WHEEL.

1,310,303. Specification of Letters Patent. Patented July 15, 1919.

Application filed October 2, 1918. Serial No. 256,623.

*To all whom it may concern:*

Be it known that we, HOWARD E. SIMMONS and PAUL R. SIMMONS, citizens of the United States, and residents of Huntington, in the county of Huntington and State of Indiana, have invented a new and Improved Automobile or Truck Wheel, of which the following is a full, clear, and exact description.

This invention relates to a wheel especially adapted for automobiles and trucks, and the invention has for its general objects to provide a puncture and bullet-proof wheel which is of comparatively simple, inexpensive and durable construction, reliable and efficient in use, and so designed as to provide a maximum resiliency by the use of air under pressure without the well-known objections to the present type of pneumatic tires.

A more specific object of the invention is the provision of a metallic wheel which is provided with an inwardly-yielding tread made up preferably, although not necessarily, of sections, with a pneumatic annular tube concentric with the hub lying inwardly with respect to the tread, so that the said tube cushions the inward movement of the sections of the tread and thereby absorbs shocks and insures smooth running of the vehicle.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the wheel partly broken away to illustrate the details of construction;

Fig. 2 is a section on the line 2—2, Fig. 1; and

Fig. 3 is a sectional view on the line 3—3, Fig. 1.

Referring to the drawings, A designates the body of the wheel and B the flexible or yielding tread. The body is made up of two symmetrical annular sections $a$, $a'$, which are placed together face to face in registering relation and fastened by bolts 1 and 2. The sections $a$ and $a'$ are provided with annular grooves $2^a$ oppositely disposed to form an annular chamber in which is placed a cushioning element formed of an outer pressure-holding tube 3 and an inner air tube 4. The portion 5 of the body located outwardly from the chamber-forming grooves $2^a$ is formed with radial passages or guideways 6 which communicate with the chamber, the walls of the guideways having inwardly extending flanges 7 at their outer edges, as shown in Fig. 3. Contiguous with each groove $2^a$ and located inwardly therefrom is a flat portion 8, and inwardly from this flat portion is a dished or conical portion 9 which extends to the hub 10. The flat portions 8 are bolted together in contact and the parts between the guideways 6 are also bolted together in contact. The grooves or channels $2^a$ are so proportioned with respect to the tube 3 that lateral spaces 11 are provided to accommodate the air-holding tube when it expands laterally under pressure of the inwardly-yielding tread.

In the present instance the tread B is made up of sections 12 formed of a metal base 13 having a rubber or other wearing block 14, all of such sections contributing to form the tire of the wheel. In the plate 13 is an inwardly extending follower 15 which slides in a guideway 6 of the wheel body, such follower having shoulders 16 that engage under the flanges 7 so as to prevent the tread sections of the wheel from becoming detached or deranged. The followers and guideways in which they slide are non-circular in cross-section, so that the tread sections cannot turn. The followers 15 are long enough to bear against the air-containing tube or cushioning element without deflating the latter, and when pressure is brought to bear upon a tread section the follower slides inwardly and further compresses the air in the cushioning element, which latter absorbs the shock and insures smooth running.

The hub C of the wheel may be of any approved construction and the sections $a$ and $a'$ of the body of the wheel are suitably fastened to the hub.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. In a vehicle wheel, a body formed of two sections having opposing grooves forming an annular chamber and provided with portions extending beyond the chamber, said portions being formed with a plurality of spaced guideways, having inwardly extending flanges, means for securing the sections together inward of the chamber and between the guideways, a pneumatic cushion element in the chamber, and a tread formed of a plurality of sections, each having a shouldered follower working in a guideway.

2. In a vehicle wheel, a body formed of two sections having opposing grooves forming an annular chamber and provided with portions extending beyond the chamber, said portions being formed with a plurality of polygonal guideways having inwardly extending flanges, means for securing the sections together inward of the chamber and between the guideways, a pneumatic element in the said chamber, and a tread formed of a plurality of sections, each having a polygonal follower having a reduced outer end and working in a guideway.

3. A vehicle wheel composed of two symmetrical sections fastened together, each part having an annular groove and guide passages extending outwardly from the groove, and the central part of each section being dished, a hub to which the sections are rigidly secured, a pneumatic tube arranged within the chamber formed by the annular grooves, and a plurality of tread sections each having a follower movable in one of the said guide passages and bearing on the pneumatic tube.

HOWARD E. SIMMONS.
PAUL R. SIMMONS.